United States Patent
Tang et al.

(10) Patent No.: US 7,645,095 B2
(45) Date of Patent: Jan. 12, 2010

(54) METHOD FOR WASTE STABILISATION AND PRODUCTS OBTAINED THEREFROM

(75) Inventors: Tsen Meng Tang, Singapore (SG); Hsing Loong Tan, Singapore (SG); Danmei Wang, Singapore (SG)

(73) Assignee: NewEarth Pte Ltd., Maxwell House (SG)

( * ) Notice: Subject to any disclaimer, the term of this patent is extended or adjusted under 35 U.S.C. 154(b) by 143 days.

(21) Appl. No.: 11/547,746

(22) PCT Filed: Apr. 7, 2005

(86) PCT No.: PCT/SG2005/000117

§ 371 (c)(1),
(2), (4) Date: Oct. 6, 2006

(87) PCT Pub. No.: WO2005/097368

PCT Pub. Date: Oct. 20, 2005

(65) Prior Publication Data

US 2008/0108495 A1       May 8, 2008

(30) Foreign Application Priority Data

Apr. 8, 2004   (SG) .............................. 200402001-2

(51) Int. Cl.
*B09B 1/00* (2006.01)
(52) U.S. Cl. ...................................... 405/252; 405/315
(58) Field of Classification Search ................. 588/252, 588/256, 315
See application file for complete search history.

(56) References Cited

U.S. PATENT DOCUMENTS

| | | | | | |
|---|---|---|---|---|---|
| 3,093,593 | A | * | 6/1963 | Arrance | ........................ 588/11 |
| 4,781,944 | A | | 11/1988 | Jones | |
| 5,168,820 | A | * | 12/1992 | Birkner et al. | ............... 110/346 |
| 6,297,419 | B1 | * | 10/2001 | Parkes et al. | .................. 588/10 |

(Continued)

FOREIGN PATENT DOCUMENTS

DE           36 30 697 A1       3/1987

(Continued)

OTHER PUBLICATIONS

Lo, I. M-C et al. "Modified clays for waste containment and pollutant attenuation," J. Envir. Engrg. Div., ASCE 123(1), 25-32, 1997.

(Continued)

*Primary Examiner*—John Kreck
(74) *Attorney, Agent, or Firm*—Birch, Stewart, Kolasch & Birch, LLP

(57) ABSTRACT

A method is provided for heavy metal stabilisation comprising: mixing waste, comprising heavy metals, with molecular sieve with the proviso that carbon-based molecular sieve is excluded, and clay; and vitrifying the mixture. In particular, a method comprising the steps of: preparing a pre-stabilised mixture by mixing waste, comprising heavy metals, with the molecular sieve, and optionally other chemicals; mixing the pre-stabilised mixture with clay; and vitrifying the obtained mixture is provided. It also provides a product comprising heavy metals that have been stabilised into the structure of the clay-based ceramic matrix, wherein the product is a vitrified product of a mixture of at least waste, comprising heavy metals, molecular sieve (with the proviso that carbon-based molecular sieve is excluded) and clay.

46 Claims, 4 Drawing Sheets

U.S. PATENT DOCUMENTS 6,710,001 B2 * 3/2004 Watanabe et al. ............ 501/155
2004/0068156 A1 * 4/2004 Forrester .................... 588/256

FOREIGN PATENT DOCUMENTS

| | | | |
|---|---|---|---|
| EP | 0 596 438 A2 | | 5/1994 |
| JP | 52074588 | * | 6/1977 |
| WO | WO 9209539 A1 | * | 6/1992 |

OTHER PUBLICATIONS

Kosal et al. "A functional zeolite analogue assembled from metalloporphyrins," Nature Materials 1:118-121, 2002.

Singer F and Singer S.S., Industrial Ceramics, p. 121, 1963.

Bulens M. and Delmonb. "The exothermic reaction of metakaolinite in the presence of mineralizers influence of crystallinity," Clay Min. 25:271-277, 1977.

Bulens et al. "Spectroscopic investigations of the Kaolinite-Mullite reaction sequence," J. Am. Ceram. Soc. 61: 81-84, 1978.

Johnson S.M. and Pask J.A. "Role of impurities on formation of Mulite from Kaolinite and $Al_2O_3$-$SiO_2$ mixtures," Am. Ceram. Soc. Bull., 61: 838-842, 1982.

* cited by examiner

Figure 1
Process 1
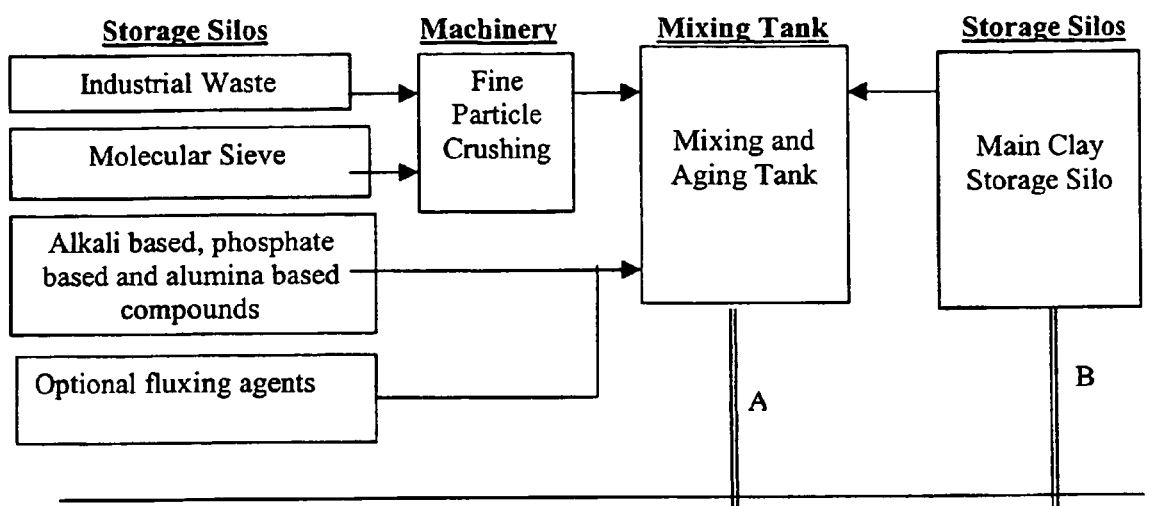
Process 2
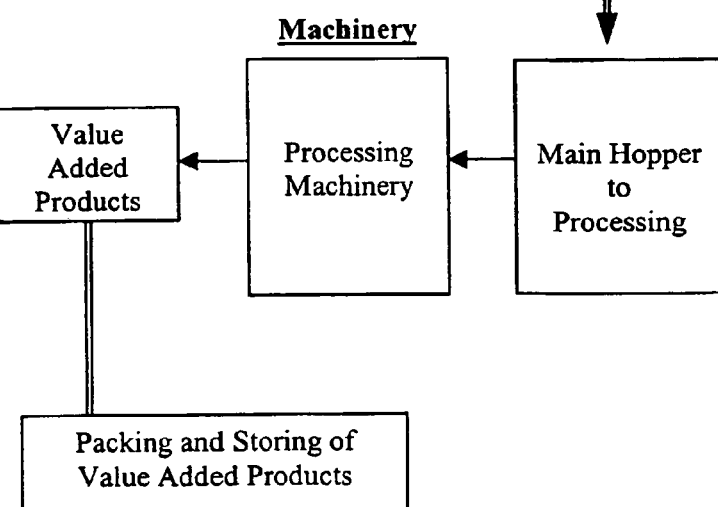

Figure 2

1) Pre-stabilization Stage 1: Ion exchange and precipitation

| Molecular Sieve | Waste containing heavy metals | Phosphate based compounds ($Na_3PO_4$) | Alkali Based compounds ($Na_2SiO_3$) | Alumina based compounds ($Al(OH)_3$ /$Al_2O_3$) | Optional fluxing agents |
|---|---|---|---|---|---|

2) Pre-stabilization Stage 2: Introduction of clay to Pre-stabilization stage 1 Mix

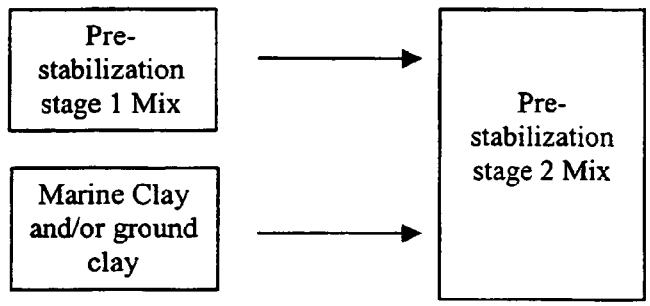

3) Pre-stabilization Stage 3: Main aging (or pre-crystallization)

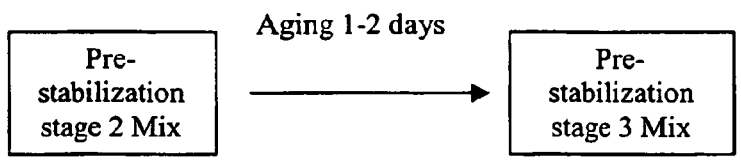

4) Preparation of Value-added Product

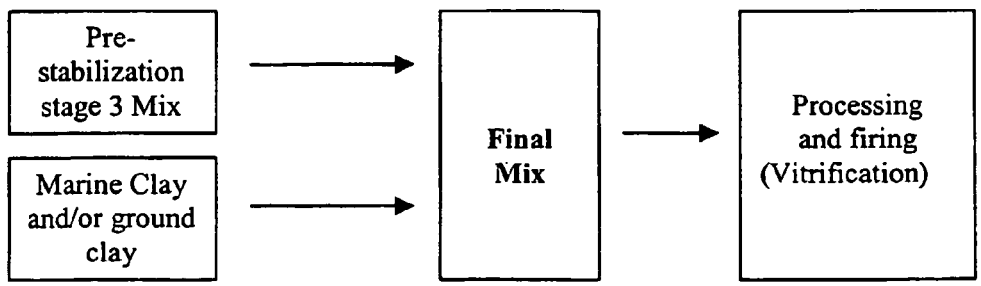

METHOD FOR WASTE STABILISATION AND PRODUCTS OBTAINED THEREFROM

FIELD OF THE INVENTION

The present invention relates to a method for waste stabilisation and value-added products obtained therefrom. In particular, the invention relates to a method for stabilising heavy metals from waste, by treating the waste with a suitable molecular sieve, clay and optionally with chemical additives.

BACKGROUND OF THE INVENTION

The waste generated by many industrial activities, as well as hazardous waste, is particularly problematic because of proper disposal requirements. Industrial waste containing heavy metals has to be treated before it is disposed. Left untreated, this waste could contaminate the environment and cause harm to life forms.

Several prior art processes have been proposed for treating and extracting toxic waste from industrial sludge. Many of these processes utilize various types of clay or shale to absorb or adsorb the heavy metals and other toxic materials from liquid and solid industrial waste.

Lo, I. M-C., et al., (1997, J. Envir. Engrg. Div., ASCE 123(1), pp 25-33) disclosed a method for the stabilisation of heavy metals in clay through heavy metal adsorption on the clay minerals. Adsorption can be external, occurring on the mineral surface, or internal, occurring within the mineral structure itself, for example, between the mineral layers of clay, as cations are attracted to the negatively charged clay particles.

Clay minerals are known to have a property termed Cation Exchange Capacity (LaGrega, M. D., 1994, McGraw-Hill, Inc., New York) whereby cations originally present in the clay structure are replaced by external cations. In fact, it is also through a cation exchange process that clay minerals, which consist of sheets of alumina and silica, acquire their overall negative charge. This happens when $Si^{4+}$ cations are replaced by lower charged cations like $Al^{3+}$, or when $Al^{3+}$ cations are replaced by divalent cations like $Fe^{2+}$, $Mg^{2+}$ or $Ca^{2+}$ (Weaver, C. E., 1989, "Clays, mud and shales." Elsevier, New York). This negative charge makes it possible for heavy metals to be adsorbed on the clay mineral surfaces (external adsorption).

The metal stabilisation begins with the migration and adsorption of heavy metals on the mineral surfaces. Furthermore, layered clay minerals like montmorillonite are known to internally adsorb cations (Conner, J. R., 1990, Van Nostrand Reinhold, New York). Montmorillonite consists of individual layers, each made up of one alumina sheet between two silica sheets linked by cations like $Ca^{2+}$. The interlayer cations can then be replaced by heavy metals through internal adsorption. Clay minerals have a basic alumina-silica structure and undergo chemical transformation when subjected to heat. These chemical transformations change the original chemical phases of the clay e.g. kaolinite and montmorillonite into mullite and cristobalite phases. The incorporation process of heavy metal cations is completed during the firing process through the formation of new phases in which the adsorbed heavy metals become incorporated. X-ray diffraction (XRD) analysis reveal that the firing process results in the transformation of kaolinite and montmorillonite, originally present in marine clay, into cristobalite and mullite, which have been reported to incorporate heavy metal cations (Schneider et al, 1994, Wiley and Sons, New York; Dion, L. B., 1996, Engineer Thesis, Stanford University, California, USA; Deer et al, 1992, $2^{nd}$ edition, Longman Scientific & Technical, New York, Wiley).

The methods for clay stabilisation as described in the prior art can be generally distinguished as "encapsulation" and "incorporation" processes. Both processes involve a final step of vitrification of the matrix.

When heavy metals are present in the form of compounds or complexes, for example as metal oxides, the added clay-based ceramic minerals encapsule (or surround) the metal compounds. However, the metal compounds are not chemically bonded with the original clay-based ceramic minerals and are not transformed into a bonded crystalline phase. The encapsulation process can be carried out in the micro (<10 μm) or macro (>10 μm) state.

Clay-based ceramic matrix has a limited capacity and once its saturation capacity has been reached there will be no more incorporation and encapsulation taking place from there on. Once the sites of the matrix are filled, the clay has exhausted its stabilisation capability. Furthermore, different clay-based ceramic matrices have different incorporation and encapsulation abilities due to their varying chemical compositions. Further, encapsulation is not an efficient mechanism of metal stabilisation because once the surrounding clay matrix is disturbed or destroyed, the metals will be freed from the matrix and leach into the environment.

When the heavy metals are present in the form of heavy metal cations and metal compound anions, the heavy metal cations and metal compound anions chemically bind to and are incorporated into the clay. After firing at elevated temperatures, the heavy metals get incorporated into the mullite and cristobalite structure as part of the clay-based ceramic matrix. However, even if the heavy metals in this form are better stabilised than those stabilised with the encapsulation method, the stabilisation capacity for the clay is limited and the heavy metals need to be present as metal cations and anions before such incorporation could take place.

Clay has a limited stabilisation capacity based on the active adsorption sites within the clay matrix. However, when the incorporation capacity of heavy metals is exceeded, the heavy metals are simply encapsulated. Under this condition, when the clay matrix is disturbed, for example by external factors, heavy metals may leach out into the environment. Kaolinite, for example, is a layered structure with limited adsorption and ion exchange properties. Because it is a layered structure, the strength of the matrix is weak and can be destroyed by acid. Heavy metals may leach out as a result.

Accordingly, a substantial drawback of the above-described prior art is that the waste materials may not be environmentally safe in the long-run. These materials need to be kept under surveillance and are not suitable for uses like construction or land filling materials.

It would therefore be desirable to provide a process which would improve the stability of hazardous heavy metals and reduce or eliminate long-term storage risks while providing safe value-added products at the same time.

SUMMARY OF THE INVENTION

The present invention addresses the problems of the prior art and provides a new method for the stabilisation of heavy metals from waste, in particular from industrial waste. The waste may be hazardous waste. The invention further relates to value-added products, comprising stabilised heavy metals from waste, which are suitable for uses like construction and/or land filling materials.

According to a first aspect, the invention relates to a method for heavy metal stabilisation comprising:

mixing waste, comprising heavy metals, with molecular sieve with the proviso that carbon-based molecular sieve is excluded, and clay; and vitrifying the mixture.

The components of the mixture may be mixed in any order or optionally according to a particular order.

The vitrification is carried out to stabilise the heavy metals by causing a phase change among the molecular sieve, clay and the heavy metals that chemically bind metals to the clay matrix or clay minerals. By addition of molecular sieve, and optionally of other chemicals, according to the invention, the incorporation capacity of heavy metals by clay matrix or clay minerals results improved.

With the vitrification step, the mixture is converted into a re-crystallised structure.

The method may comprise adjusting the pH of the mixture to the range of 8.0-12.0, preferably 9.5.

The method further comprises the addition of alkali based and/or phosphate based compounds, in particular, $Na_2SiO_3$ and/or $Na_3PO_4$. The alkali based compound and phosphate based compound may be added in different proportions, for example, in ratios ranging from 50:50 to 100:0 in volume of alkali based compound to phosphate based compound. In particular, the $Na_2SiO_3$ and $Na_3PO_4$ can be added in different proportions. For example, the ratio of $Na_2SiO_3$ to $Na_3PO_4$ is from 50:50 to 100:0 in volume.

The method may further comprise adding alumina based compounds, in particular, aluminium hydroxide $(Al(OH)_3)$ and/or aluminium oxide $(Al_2O_3)$ to the mixture.

Sludge from water and/or wastewater treatment plants may be used as a source of alumina based compounds, in particular, as a source of aluminium hydroxide and/or aluminium oxide.

As for the molecular sieve, any suitable molecular sieve for the purpose of the present invention may be used. However, carbon-based molecular sieves are particularly excluded from the present invention. Also, if the waste is non-hazardous waste containing heavy metals, then a molecular sieve may not be used for the method of the present invention.

According to one aspect of the invention, the molecular sieve may be natural and/or synthetic. In particular, it comprises at least Si and/or Al. According to another aspect, the Si and/or Al is substituted by at least one of B, Ca, Zn, Ga, Ge, Ti, V, Fe or P. Further suitable substituents may also be used.

One type of molecular sieve may be used. Alternatively, a mixture of one or more molecular sieves may be used. The molecular sieve may also comprise at least one of B, Ca, Zn, Ga, Ge, Ti, V, Fe, P, Si or Al. The molecular sieve(s) may have a porous structure of different pore sizes. Examples of molecular sieves include metalloporphyrin solids, PIZA-1 and SAPO.

A particular example of a molecular sieve is zeolite. Zeolite is natural or synthetic. It may be in the form of spent synthetic zeolite from petroleum/petrochemical refining processes (FCC and/or RCC).

According to a particular embodiment, the method according to the invention comprises:

preparing a pre-stabilised mixture 1 by mixing waste, comprising heavy metals, with molecular sieve (with the proviso that carbon-based molecular sieve is excluded);

mixing the pre-stabilised mixture 1 with clay forming a pre-stabilised mixture 2; and vitrifying the obtained mixture.

The mixture is vitrified to stabilise the heavy metals by causing a phase change among the molecular sieve, clay and heavy metals.

According to a particular aspect of the invention, the steps involved in the preparation of the pre-stabilised mixture 2 may comprise:

mixing waste, comprising heavy metals with the molecular sieve; and adding alkali based and/or phosphate based compounds to form the pre-stabilised mixture 1;

mixing the pre-stabilised mixture 1 with clay to form the pre-stabilised mixture 2;

leaving the pre-stabilised mixture 2 to age.

In particular, the step of adding alkali based and/or phosphate based compounds comprises the addition of $Na_2SiO_3$ and/or $Na_3PO_4$.

The preparation of the pre-stabilised mixtures 1 and/or 2 may further comprise adding at least an alumina based compound, in particular, aluminium hydroxide and/or $Al_2O_3$ to the pre-stabilised mixture at the same time, before or after the addition of alkali based and/or phosphate based compounds, in particular, $Na_2SiO_3$ and/or $Na_3PO_4$. The mixing steps involved in the method of the invention may be carried out in any particular order.

According to another aspect of the invention, the method according to any other aspect of the invention may further comprise a step of adding at least one fluxing agent to the mixture. In particular, the fluxing agent may be borate.

The vitrification process of any embodiment according to the invention may be achieved by using a high temperature treatment of up to 1400 degrees Celsius.

According to a particular aspect, the vitrification process may comprise the following firing profile:

A: heating from room temperature to 450-550° C.;

B: constant temperature at 450-550° C.;

C: heating from B to 750-900° C.;

D: constant temperature at 750-900° C.;

E: heating from D to 900-1300° C.;

F: constant temperature from E; and

G: cooling.

In particular, the firing profile of step E may comprise heating from D to 950-1250° C.

In particular, the temperature of steps A, C and E increases at the rate of 5° C./minute to 20° C./minute. The temperature of steps B, D and F may be kept constant for: 30 minutes to 12 hours in step B; 30 minutes to 12 hours in step D; 30 minutes to 60 hours in step F. The range of temperature depends on the size, shape and chemical composition of the material to be fired and also on the type of furnace used, i.e. tunnel furnace, batch furnace or rotary furnace. The cooling of step G may be natural cooling.

According to a further aspect, the invention relates to a vitrified product obtained or obtainable by the method of any embodiment of the invention.

The product according to the invention is a value added product comprising stabilised heavy metals, wherein the product is a vitrified product of a mixture of at least waste, comprising heavy metals, the molecular sieve and clay. As for molecular sieve, any suitable molecular sieve can be used but preferably Al and/or Si based molecular sieve. Carbon-based molecular sieves are not suitable and therefore excluded for the purposes of the present invention. The product of the invention may be a product wherein the mixture which is vitrified further comprises at least one of alkali based, phosphate based or alumina based compounds. In particular, the alkali based compound may be $Na_2SiO_3$, the phosphate based compound may be $Na_3PO_4$, and the alumina based compound may be aluminium hydroxide $(Al(OH)_3)$ and/or aluminium oxide $(Al_2O_3)$.

According to an embodiment, the product is such that the mixture which is vitrified is obtained by preparing a pre-stabilised mixture comprising waste and molecular sieve (with the proviso that carbon-based molecular sieve is excluded), and mixing the pre-stabilised mixture with clay. The pre-stabilised mixture may further comprise at least one of alkali based, phosphate based or alumina based compounds. In particular, the alkali based compound may be $Na_2SiO_3$, the phosphate based compound may be $Na_3PO_4$ and the alumina based compound may be $Al(OH)_3$ and/or $Al_2O_3$.

The product obtainable or obtained by a method according to any embodiment of the invention is a value-added product suitable for example, for construction or land reclamation/filling.

The vitrified product may be, for example, in the form of bricks, cinder blocks, tiles, concrete aggregates, sand-like raw material for concrete or land fill material, or gravel-like aggregate material for concrete or road construction, road barrier, erosion control blocks, construction blocks, retaining wall blocks, rail road ties, bricks or blocks for cobble sidewalk or street, stones or tiles for patio or sidewalk, sewer or drain pipes, fibre glass insulation, ceiling tiles, wall boards, roofing tiles, and floor tiles.

BRIEF DESCRIPTION OF THE FIGURES

FIG. 1 illustrates a particular embodiment of the method of the invention.

FIG. 2 illustrates a particular embodiment of the method of the invention.

DETAILED DESCRIPTION OF THE INVENTION

Figure 3:
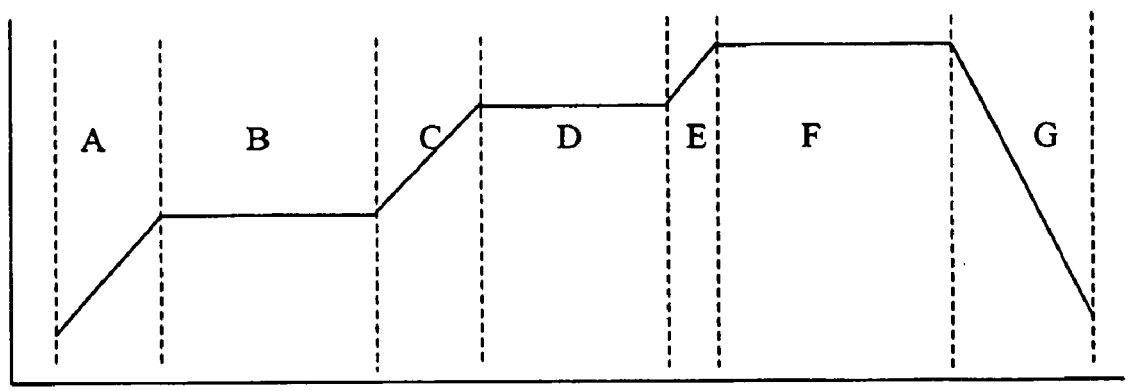
FIG. 3 shows temperature profile of the firing process according to a particular embodiment of the invention.

The present invention relates to a method for stabilising certain contaminants including toxic metallic compounds and metallic cations from waste, like wastewater, sludge, and/or solid waste. The waste may be industrial waste comprising heavy metals. The waste may also be hazardous waste comprising heavy metals. The invention further provides a method to stabilise other organic components as well as many other types of contaminants other than heavy metals.

According to one aspect, the present invention provides a method for heavy metal stabilisation comprising:
mixing waste, comprising heavy metals, with molecular sieve with the proviso that carbon-based molecular sieve is excluded, and clay; and
vitrifying the mixture.

As for the molecular sieve, any suitable molecular sieve for the purpose of the present invention may be used. Carbon-based molecular sieves are not suitable and therefore particularly excluded from the present invention. Accordingly, for the purposes of the present invention the wording "molecular sieve" or "molecular sieves" will only refer to molecular sieve(s) suitable for the purposes of the present invention. Even if not explicitly indicated, the wording molecular sieve(s) will not include carbon-based molecular sieve(s), which are disclaimed from the present invention.

The components of the mixture may be mixed in any order or optionally according to a particular order.

With the vitrification step, the mixture is converted into a re-crystallised structure. The vitrification is carried out to stabilise the heavy metals by causing a phase change among the molecular sieve, clay and heavy metals.

According to the present invention the waste material, comprising heavy metals, is mixed together with at least molecular sieve and clay. After vitrification, the waste becomes part of the final value-added product which can be used for example, in construction or for land filling.

For the purposes of the present invention, "waste" means any waste comprising heavy metals. The waste comprising heavy metals may be wastewater, solid waste, and/or sludge. The waste may be industrial waste. A non-limiting list of examples of waste, including industrial waste comprising heavy metals, includes: spent carbon from absorption processes, spent carbon from residue oil cracking processes, spent clay from petrochemical refining, spent catalyst from petroleum/petrochemical refining, spent waste and/or sludge from petroleum and/or petrochemical refining, waste sludge from semiconductor processes containing arsenic and other metals, incinerator bottom ash and/or fly ash, spent copper slag and sludge from ship sand blasting, waste sludge from water and/or wastewater treatment plants, sawing and/or etching waste from electronics industries, slag from metal refining, $TiO_2$ waste from paint industries, heavy metal contaminated clay, inorganic waste containing heavy metals and any other type of waste containing heavy metals. An example of spent carbon from absorption processes and from residue oil cracking processes is partial oxidation carbon (POX). An example of spent catalyst from petrochemical refining is a hydrotreating catalyst, hydrocracking and/or FCC catalyst.

While in general the waste comprising heavy metals according to the invention will be "hazardous waste", any waste comprising heavy metals which may not be considered to be within the definition of "hazardous" may also be used and is within the scope of the present invention. "Hazardous waste" for the purposes of the present invention is defined as a subset of waste, which may be solid, liquid, semi-liquid or semi-solid, sludge, or the like, comprising heavy metals, that pose potential threats to public health or to the environment and meet any of the following criteria: is specifically listed as a hazardous waste by US Environmental Protection Agency (EPA)(http://www.epa.gov/); or exhibits one or more of the treatment of hazardous waste.

Other wastes comprising heavy metals suitable for the purposes of the present invention will be evident to those skilled in the art.

The waste comprising heavy metals can be in any form, for example, liquid, solid, or a mixture thereof. Liquid waste may also be de-watered or heavy metals may be precipitated, using standard technologies, before being processed according to the invention.

The term heavy metal is understood to mean any heavy metal which may be considered toxic or hazardous to life form. For example, to animals, including humans, microorganisms, or plants. The term "heavy metal or heavy metals" as defined in "waste comprising heavy metals" includes, but not limited to, metallic ions, metallic compounds, metallic compound anions, and the like. Examples of hazardous heavy metals include, but not limited to, arsenic, cadmium, chromium, cobalt, copper, gallium, lead, magnesium, manganese, molybdenum, nickel, silver, palladium, platinum, selenium, tungsten, uranium, vanadium, zinc, and the like.

According to the method of the invention, the waste comprising heavy metals is mixed with the molecular sieve.

Molecular sieve is defined in this disclosure as a solid with a microporous, mesoporous or macroporous structure for the purpose of adsorption and ion-exchange.

Molecular sieves have crystal structures with ordered pore structures that are demonstrated by distinct X-ray diffraction patterns. The crystal structure defines cavities and pores which are characteristic of the different species. The pores may be uniformly or non-uniformly distributed. Molecular sieves can be described to be microporous metalloporphyrin solids, which have been described by Kosal et al., 2002, Nature Materials, 1, 118-121 (the content of which is herein incorporated by reference). For example, the compound identified as PIZA-1 (Kosal et al.). Another example is SAPO, which is silica-alumino-phosphate. These are microporous materials containing 8, 10 or 12 membered rings structures. The ring structures can have an average pore size ranging from about 3.5 angstroms to 10 angstroms (Developed by Union Carbide, http://crtc.caer.uky.edu/text.htm). The molecular sieve may be in the form of powder or pellets.

For the purpose of the present invention, the term "molecular sieve" as used herein will exclude carbon-based molecular sieves as carbon burns at high temperatures of 800° C. or higher. During the step of vitrification, higher temperatures are used in the method of the present invention, thus making carbon-based molecular sieves inappropriate for the present invention.

Further, molecular sieve as referred to in the present invention means that at least one type of molecular sieve or a mixture of different types of molecular sieves may be used.

Molecular sieves may be natural or synthetic. Synthetic molecular sieves are usually prepared under hydrothermal conditions from alumosilicate or phosphate gels. Their crystallisation is achieved through prolonged reaction in an autoclave for 1-50 days and, often times, in the presence of structure directing agents (templates). The proper selection of template is of extreme importance for the preparation of a particular framework and pore network (Meier et. al., Atlas of Zeolite Structure Types, Butterworth, London, 1992). An example of a synthetic molecular sieve is PIZA-1 (Kosal et. al.).

In particular, molecular sieve comprises at least Si and/or Al. Further, the molecular sieve is a crystalline framework material in which the Si and/or Al tetrahedral atoms of the lattice may be substituted by other metal atoms such as B, Ca, Zn, Ga, Ge, Ti, V, Fe or P. The molecular sieve may also be in the form of complexes. For example, crystalline aluminophosphate compositions, SAPO, metal substituted aluminophosphates, MeAPO's where $[MeO_2]$, $[AlO_2]$ and $[PO_2]$ form a tetrahedral microporous structure, and Me is a metal source having one or more divalent elements, Zn, Mn, Fe, Mg and Co, and trivalent Fe, metal sulphide molecular sieves and metallozinc phosphate compositions.

A particular example of a molecular sieve is zeolite. Zeolites are framework silicates consisting of interlocking tetrahedrons of $SiO_4$ and $AlO_4$. The alumino-silicate structure is negatively charged and attracts the positive cations that reside within. Zeolites have large vacant spaces or cages in their structures that have space for large cations such as sodium, potassium, barium, calcium or other heavy metals and relatively large molecules and anion groups such as water, ammonium ions, carbonate ions and nitrate ions. In the preferred zeolites, the spaces are interconnected and form long wide channels of varying sizes depending on the mineral. These channels allow the easy movement of the resident ions and molecules in and out of the structure.

Zeolites perform ion exchange, filtering, odour removal, chemical sieve and gas absorption tasks. The most well known use for zeolites is in water softeners. Calcium in water can cause it to be "hard" and capable of forming scum and posing other problems. Zeolites charged with the much less damaging sodium ions can allow the hard water to pass through its structure and exchange the calcium for the sodium ions.

Any zeolite known in the art suitable for the method of the present invention can be used. Zeolite may be natural and/or synthetic. For example, synthetic Y-type zeolite, ultrastable Y-type zeolite, ZMS-5 and β-mordenite, X-type zeolite and A-type zeolite, ZK-5, ZK-4, synthetic zeolite like FCC/RCC zeolites, faujasite, clinoptilolite, chabazite and erionite (*Zeolite Molecular Sieves: Structure, Chemistry and Use*, Donald Breck, Malabar F., 1984; *Zeolites and clay minerals as sorbents and molecular sieves*, R. M. Barrer, London, Academic Press, 1978; *Catalysis and zeolites: fundamentals and applications*, J. Weitkamp, L. Puppe, New York, Springer, 1999; *Synthesis of porous materials: zeolites, clays, and nanostructures*, Mario L. Occelli, Henri Kessler, New York, 1997). Different types or a mixture thereof of zeolites can be used in the method of the invention. The zeolite(s) may have a structure of different pore sizes.

As a source of zeolite, any zeolite-based compound or any composition comprising zeolite can be used. For example, zeolite of different pore size, spent zeolite from petroleum/petrochemical refining processes, spent zeolite from petroleum refining processes involving the removal or extraction of heavy metals from a slurry, zeolite-based materials and compounds.

For the purpose of the present invention, any compound having characteristics or behaviour similar to that of zeolite may be used. These may be conveniently referred to as zeolite analogues. It will be evident to any skilled person that any compound having characteristics similar and/or having a function similar to that of zeolite may be used for the purpose of the present invention. Accordingly, molecular sieve compounds which have not been described in the present application as well as molecular sieve compounds which have not been discovered yet, are within the scope of the present invention.

Heavy metal ions in waste and precipitated compounds adsorb onto the molecular sieve structure and clay mineral structure. The process of the invention may utilise various types of clay, either natural, partially or fully synthesised. For the purpose of the present disclosure, the term "clay" includes the term "shale". The term "clay" also includes a mixture of different types of clay or shale and a mixture of clay and shale. The clay and shale are a naturally occurring family of minerals that are hydrous alumina-silicates. They may contain one or more of the following (or other equivalent) minor or trace elements: magnesium, iron, potassium, sodium and oxygen. Shale and clay are similar types of rocks, differing to some extent in the degree of geological weathering, hardness and friability as a result of differences in geological and climatic conditions both at time of the formation or thereafter. Clay and shale both have a silicate composition desirable for this invention and may be either comingled (blended/mixed) or difficult to differentiate. Clay may be marine and/or ground clay. Clay or shale suitable for the invention may be, for example, kaolinite, and/or montmorillonite and those comprising minerals that include hydrous alumina-silicates.

Structurally, the clay minerals consist of layers of aluminium and silicon ions or atoms bonded together by oxygen atoms or combinations of oxygen and hydrogen atoms which are between the two layers. The clay mineral particles are held together by electrostatic charges on the surfaces and edges of the particles. Magnesium and iron replace some of the aluminium atoms in some clay minerals. Replaceable sodium, calcium and potassium ions occur on the surfaces and edges of many clay mineral particles. These replaceable ions or any ions and molecular layers of water between the clay particles determine to a large extent the plastic properties of a clay mineral.

Clay, on the basis of their mineralogy, is grouped under three categories: kaolinites, montmorillonites and illites. The Kaolinite group includes the mineral kaolinite, dickite, nacrite, halloysite, anauxite and allophane; all of which are hydrous aluminum silicates. Montmorillonite, saponite, notronite, hectorite and beidellite comprise the montmorillonite group and consist of hydrous silicates of aluminum, magnesium, iron and some varieties of lithium. Montmorillonites commonly contain calcium and sodium as replaceable ions. Illite, as a group name, has been applied to the micaceous varieties of clay which are complex hydrous silicates of potassium, aluminum, iron and magnesium. Although Kaolinite and Montmorillonite are preferred, other clay and shale have been found to work for this process and may also be used.

The clay is crushed into small (fine) particles during processing to increase the adsorption of the heavy metals to a maximum. After obtaining the clay from any of the foregoing sources, it is processed into a very fine particle form. Most clay will degrade into a fine particle size as required in this invention in a properly designed mixer. If the clay is hard, it will have to be pre-crushed to the desired size.

According to one embodiment, the method of the invention comprises mixing waste, comprising heavy metals with the molecular sieve and clay. Optionally, chemical additives like alkali based and/or phosphate based compounds, in particular, $Na_2SiO_3$ and/or $Na_3PO_4$, may be added to the mixture. Other compounds like alumina based compounds, in particular, aluminium hydroxide ($Al(OH)_3$) and/or aluminium oxide ($Al_2O_3$) may be added to the mixture as well. These compounds do not have to be mixed in any particular order. The obtained mixture is then vitrified to create the value added product. The mixture is optionally aged before the vitrification step.

However, according to a particular embodiment of the invention, the various components are mixed in a particular order.

The alkali based and/or phosphate based compounds may be used to precipitate the heavy metals from the waste (in particular industrial waste) to convert the contaminants (heavy metals) into a solid form. In particular, the alkali based and/or phosphate based compounds may be $Na_2SiO_3$ and/or $Na_3PO_4$. The heavy metals will be contained within the stabilised mass as part of the material structure. This technology is designed to address the long-term problem of disposal of waste that cannot be regulated or further reduced in volume. The precipitated heavy metals may be in the form of metal cations, compounds and/or complexes.

The processes involves the conversion of the liquid, sludge or solid waste into a solid, structurally sound material, which can be used for land reclamation or other purposes. The solid produced will not only bond or encapsulate the waste in a solid matrix of low permeability, but also chemically fix the heavy metals and any other hazardous substance so that they are immobilised. This process involves chemical precipitation, chemical adsorption, physical encapsulation and re-crystallisation.

Alumina based compounds may also be added to the mixture for additional stabilisation effect. In particular, $Al(OH)_3$ and/or $Al_2O_3$ may be added. In particular, meta-stable phase of alumina or gamma-alumina may be selected for this stabilisation step due to its properties. Alternatively, other forms of $Al_2O_3$ can also be used. The meta stable phase, gamma or beta phase of alumina has a defected spinal structure which allows a well defined number of cation vacancies to occupy, at random, the available tetrahedral and octahedral sites in the crystal. It also has a large surface area. As a result there is a high concentration of surface acid sites for better adsorption and ion exchange.

According to a particular embodiment, the invention provides a method comprising:
  preparing a pre-stabilised mixture 1 by mixing waste, comprising heavy metals, with molecular sieve (with the proviso that carbon-based molecular sieve is excluded);
  mixing the pre-stabilised mixture 1 with clay to form a pre-stabilised mixture 2; and
  vitrifying the obtained mixture.

In particular, the resulting pre-stabilised mixture 1 is a slurry-based mixture. A slurry-based mixture may be defined as a mixture of water or other liquids and insoluble solids. A slurry-based mixture may be prepared according to standard technologies and methods known by the person skilled in the art. In particular, a slurry-based mixture comprising water between 25% to 90% of the total weight of the slurry mixture would be preferable.

The mixture is vitrified to stabilise the heavy metals by causing a phase change among the molecular sieve, clay and heavy metals.

According to a particular method, the step of preparation of the pre-stabilised mixture may comprise:
  mixing waste, comprising heavy metals with the molecular sieve;
  adding alkali based and/or phosphate based compounds, obtaining the pre-stabilised mixture 1;
  adding clay, obtaining the pre-stabilised mixture 2; and
  leaving the pre-stabilised mixture 2 to age, obtaining the pre-stabilised mixture 3.

In particular, the step of adding alkali based and/or phosphate based compounds comprises the addition of $Na_2SiO_3$ and/or $Na_2PO_4$. Further, the pre-stabilised mixture 1 obtained may be a slurry-based mixture.

The preparation of the pre-stabilised mixture may further comprise adding at least an alumina based compound, in particular, $Al(OH)_3$ and/or $Al_2O_3$ to the pre-stabilised mixture at the same time, before or after the addition of the alkali based and/or phosphate based compounds. The alkali based and/or phosphate based compounds may be $Na_2SiO_3$ and/or $Na_3PO_4$.

According to a more particular embodiment, which is exemplified in FIGS. 1 and 2, the method of the invention comprises: preparing a pre-stabilised mixture (1) by mixing waste, comprising heavy metals, with the molecular sieve (pre-stabilisation stage 1); mixing the pre-stabilised mixture (1) with clay or shale in order to obtain a pre-stabilised mixture (2) (pre-stabilisation stage 2); and vitrifying the obtained mixture (final stage). Alkali based and/or phosphate based compounds, in particular, $Na_2SiO_3$ and/or $Na_3PO_4$, and/or alumina based compounds, in particular, $Al(OH)_3$ and/or $Al_2O_3$, may also be added during the preparation of the pre-stabilised mixture (1). The pre-stabilised mixture (2) may be left to age (pre-stabilisation step 3) and the aged mixture (pre-stabilised mixture 3) is then processed according to the final vitrification stage. An example of the above method is exemplified by arrow A in FIG. 1. Optionally, further clay may be added to the mixture during the final stage before vitrification (as shown by arrow B in FIG. 1). The ageing step is also indicated as pre-crystallisation step.

It is submitted that the schemes of FIGS. 1 and 2 are useful for the ease of understanding of the process of the invention. However, the scope of the method of invention is not limited to such a particular order as outlined in FIGS. 1 and 2. In fact, waste, molecular sieve, clay and the optional chemical additives, such as alkali based and/or phosphate based chemicals, in particular, $Na_2SiO_3$ and/or $Na_3PO_4$, and alumina based compounds, in particular, $Al(OH)_3$ and/or $Al_2O_3$, may be added and mixed in any order. It will be understood that any feature, condition or compound mentioned in the description of one embodiment of the invention can be applied equally in the performance of any other embodiment of the invention.

As illustrated in FIGS. 1 and 2, the method according to the second embodiment may be distinguished in a "Process 1" (stages 1, 2 and 3) wherein pre-stabilised stages-1, 2 and 3 mixtures are prepared, and a "Process 2" which comprises the vitrification step. In particular, in process 1, the pre-stabilised mixture is divided into pre-stabilised stages-1, 2 and 3 mixtures. However, according to one aspect, the process may comprise the preparation of a pre-stabilised mixture by:

Process 1 (Pre-Stabilisation Stages 1, 2 and 3)

Pre-Stabilisation Stage 1

Industrial waste, the molecular sieve and optional chemical additives ($Na_2SiO_3$ and/or $Na_3PO_4$, $Al(OH)_3$ (aluminum hydroxide) and/or $Al_2O_3$) may be conveniently stored in separate silos of varying capacities (FIG. 1). The chemical additives may be alkali based compounds, phosphate based compounds and/or alumina based compounds. In particular, the alkali based and/or phosphate based compounds may be $Na_2SiO_3$ and/or $Na_3PO_4$. The alumina based compounds may be $Al(OH)_3$ and/or $Al_2O_3$.

Fine particle crushing may be carried out for industrial wastes and molecular sieve that have a large particle size. However, this step is not carried out if the particles are already fine enough. The particle size at this stage should ideally be in the sub micron range (1 μm-250 μm).

The molecular sieve is introduced into a mixing tank or any other suitable container or machinery. Industrial wastes comprising heavy metals is then introduced into the tank (although waste and the molecular sieve may be added in any order). The mixture (pre-stabilised stage 1 mixture) is then mixed into a paste by the addition of water and left to age, for example for 15 minutes—48 hours, to sufficiently allow ion exchange to occur. In particular, the ageing time is 15 minutes-5 hours, and even more in particular, 2 hours. This new mixture is described as a pre-stabilised mixture as the adsorption process can be reversed by a change in the pH value. Preferably, the pre-stabilised stage 1 mixture is mixed into a slurry paste by the addition of water.

The proportion of the molecular sieve and industrial waste in the pre-stabilised mixture may vary depending on the purpose of the method of the invention. For example, the ratio of the molecular sieve to industrial waste is 1:2000 to 7:3 of dry weight. When non-hazardous wastes are involved, the addition of molecular sieve may be omitted.

The pre-stabilised stage 1 mixture is then left to age, for example, for 15 minutes—48 hours. In particular, the mixture is left to age for 15 minutes-24 hours.

Chemical additives may optionally be added to the pre-stabilised stage 1 mixture into the mixing tank. The chemical additives comprise alkali based and/or phosphate based compounds. For example, $Na_2SiO_3$ and/or $Na_3PO_4$. Following that, alumina based compounds may be added. The alumina based compounds may be added at the same time, before or after the addition of the alkali based and/or phosphate based compounds, such as $Na_2SiO_3$ or/and $Na_3PO_4$. The alumina based compounds may be $Al(OH)_3$ and/or $Al_2O_3$. The pre-stabilised stage 1 mixture is gently agitated and mixed.

The pH of the pre-stabilised stage 1 mixture (or of the mixture in general with reference to the method of the first embodiment) may be adjusted to a value between 8.0 and 12.0, in particular 9.5.

The pH can be adjusted by adding any substance according to any standard method known in the art.

For example, the alkali based and/or phosphate based compounds, which may include $Na_2SiO_3$ and/or $Na_3PO_4$, may be added into the pre-stabilised stage 1 mixture to adjust the pH of the mixture to 8-12.0, in particular 9.5, where precipitation of metallic compounds will occur. The metal compounds that may form are metal silicates, metal phosphates, and metal hydroxides. It will be clear to any skilled person that the amount of chemicals added would be a quantity needed to bring about a change in pH and to cause precipitation.

The ratio of the alkali based compounds to the phosphate based compounds in the pre-stabilisation stage 1 mixture is preferably between the range of 50:50 to 100:0 in volume. In particular, the alkali based and phosphate based compounds are $Na_2SiO_3$ and $Na_2PO_4$.

The addition of the phosphate based compound is optional. In particular, the phosphate based compound may be $Na_3PO_4$. However; it may be added into the pre-stabilised stage 1 mixture as and when it is required, as it will reduce the final crystallisation temperature of the end product. This is especially useful when industrial waste with high metal content is to be treated.

Added Effect on the Addition of the Phosphate Based Compound

When encountered with industrial waste with high calcium content, phosphoric acid could be added ($H_3PO_4$) to react with free calcium to form apatites as an alternative route.

When there is calcium present in the industrial waste or clay material, the addition of phosphate based compounds to the mixture will result in reaction between free calcium and phosphate and a compound called apatite will be formed. In particular, the phosphate based compound may be $Na_3PO_4$. Apatites formed could be in the amorphous to crystalline phase. Heavy metals present in the mixture will be able to be incorporated into the apatites and form new metal-apatite compounds which are very stable. Apatite has good metal sorption capabilities. Some metals, such as lead, can enter the apatite mineral structure during precipitation of new solids, e.g., lead-apatite, or by exchanging with calcium in an existing calcium-apatite.

In addition there is a firing of the mixture with molecular sieve and alumina based compounds, which results in new chemical phase and further increases the stability of the end product.

It is well documented that apatite has good metal sorption capabilities. Specific metals, such as lead, can enter the apatite mineral structure during precipitation of new solids, e.g., lead-apatite, or by exchanging with calcium in an existing calcium-apatite.

Metals sequestered in apatite minerals have great durability and leach resistance significantly exceeding other chemically stabilized forms. This is because the apatite mineral structure is very stable over a wide range of environmental conditions, e.g., pH 2 to 12, up to 1000° C., in the presence of aqueous and non-aqueous phase liquids. The reaction between the apatite and metals is also rapid and so the reaction is effective immediately.

Metal silicates formed from the use of alkali based compounds are particularly useful as they are easily incorporated into the final stabilised silica-alumina matrix. In particular, the alkali based compound is $Na_2SiO_3$.

As a source of alumina based compounds, industrial waste, for example, sludge from water and/or wastewater treatment plants could be used as they consist of mainly aluminium hydroxide. Through drying and firing processes, the aluminium hydroxide is converted into $\gamma$-$Al_2O_3$ that can incorporate metal cations.

The proportion of alumina based compounds that may be added can vary from 0% to 60% of pre-stabilisation stage 1 mixture, depending on the metal concentration. In particular, the alumina based compound is aluminium hydroxide.

$Al_2O_3$ (aluminum oxide) may also be added to the pre-stabilised stage 1 mixture for additional stabilization effect. In particular, meta-stable phase of alumina or gamma-alumina may be selected for this stabilisation step due to its properties. Alternatively, other forms of $Al_2O_3$ can also be used. The meta stable phase, gamma or beta phase of alumina has a defected spinal structure which allows a well defined number of cation vacancies to occupy, at random, the available tetrahedral and octahedral sites in the crystal. It also has a large surface area. As a result there is a high concentration of surface acid sites for better adsorption and ion exchange.

The proportion of $Al_2O_3$ to be added can vary from 0.01% of total dry mixture to 40% of pre-stabilisation stage 1 mixture.

Fluxing agents may also be added to the pre-stabilised stage 1 mixture. Fluxing agents are known to promote the maturing of ceramic bodies at lower temperatures and also provide better physical characteristics to the matrix (Singer F and Singer S. S., Industrial Ceramics, 1963, page 121). Examples of fluxing agents include compounds of alkali metals such as lithium, sodium and potassium; magnesium and alkaline earth metals such as calcium, strongtium and barium; boron, zinc, lead and bismuth. In particular, the fluxing agent used in this process is borate.

Borate is known for its low melting point and for its fluxing action in reducing the fusion temperature of glazes. It can be added in very small amounts to some ceramic compositions for this purpose and is capable of promoting crystallisation by lowering the viscosity of the glassy phase (http://www.digitalfire.ab.ca/cermat/material/127.html).

When alkali based and/or phosphate based compounds, in particular, $Na_2SiO_3$ and/or $Na_3PO_4$, and/or alumina based compounds, in particular, aluminium hydroxide and/or $Al_2O_3$ is added, the pre-stabilisation stage 1 mixture is left to age for a further 5 minutes to 6 hours. In particular, the mixture is left to age for a further 30 minutes to 6 hours.

Pre-Stabilisation Stage 2

Clay, because of the presence of kaolinite and montmorillonite, also adsorbs heavy metal ions into its mineral structure. A suitable clay or mixture of different types of clay, for example marine clay or ground clay, is then added into the pre-stabilised stage 1 mixture in varying proportion and mixed uniformly to give a new mixture, described as pre-stabilised stage 2 mixture (FIG. 2). The pre-stabilised stage 2 mixture comprises 10%-90% of clay, depending on the toxicity of the mixture. In particular, the pre-stabilised stage 2 mixture comprises 30%-80% of clay.

Pre-Stabilisation Stage 3

The pre-stabilised stage 2 mixture is then left to age for a suitable time from 15 minutes to 48 hours to allow sufficient time for chemical reactions to occur and migration of metal ions and metal compounds to the pore structure of the zeolite and the layered structure of the clay minerals, to form a pre-stabilised stage 3 mix. In particular, the time is 30 minutes to 48 hours.

Process 2

The pre-stabilised stage 3 mixture is introduced into the main hopper leading to the clay processing machinery. More clay, for instance, marine clay may be added at this stage to the hopper.

The pre-stabilised stage 3 mixture and additional clay is subjected to further mixing and optionally to milling which mixes the two materials together and reduces the particle size further. This stage is carried out to give a further layer of protection or "macroencapsulation".

Macroencapsulation is defined as the mechanism by which waste heavy metals are physically entrapped in a large structural mixture (matrix) of at least molecular sieve and clay. Through this mechanism, the hazardous waste heavy metals are held in the discontinuous pores within the hazardous material.

The final mixture comprises a proportion of 30%-90% of clay. In particular, the final mixture comprises a proportion of 60%-90% of clay.

The final mixture goes through a well known processing machinery for clay based ceramic product making, consisting of a series of grinding, milling, mixing, extrusion moulding and lastly vitrification.

Vitrification may be defined as a high temperature conversion process of chemical form. It is widely used, as glassy materials are based on vitreous or crystalline silicates or phosphates. Silicate glass has a crystal structure formed by the continuous tetrahedron lattice of $SiO_4$. Alumina can form part of glass as tetrahedrally configured $AlO_4$, and metals in the waste can fill the vacancies in the skeleton. Stabilisation provides strong adherence through the alumina-silica interactions. Phosphate-based systems have the advantage of being formed at lower temperatures, for example less than 1000° C. Chemical bonding of metals to $P^{5+}$ or $PO_4^{-3}$, with the phosphorous present as Pahedron, a phosphate phase is possible. Stabilisation also occurs, as the phosphate metals are of low viscosity. This mechanism is executed during the firing process in the furnace.

More in particular, the vitrification process converts the molecular sieve and clay mineral structure with the adsorbed metal compounds into a mullite and cristobalite crystal form that locks the adsorbed metals permanently. The vitrification at elevated temperatures (about 1000° C. or above) allows to permanently stabilise the heavy metal cations by causing phase changes to occur to both the clay minerals and molecular sieve. In fact, at such temperatures, the alumina-silica matrices of the clay minerals and molecular sieve support undergo phase transformation to produce mullite and amorphous silica, which crystallize into cristobalite. As a result, the trapped heavy metals remain inside the microstructure of the new phases and become incorporated in the newly formed matrices. Indeed, phase transformation involves radical structural changes in the mineral structures during which the heavy metals become part of the new mullite and cristobalite phases.

Zeolite itself is an alumina-silica network with about 60-weight % silica and 40-weight % alumina. X-ray diffraction (XRD) analysis shows that sintering of zeolite alone can also result in the formation of mullite phase, although at higher firing temperatures.

Clay induces the melting process of the molecular sieve to occur at lower temperatures. This can be achieved because of the presence of mineralisers in marine clay, such as titanium dioxide, iron (iii) oxide, calcium oxide, sodium oxide and potassium oxide, which have been reported to enhance the crystallization of mullite (Bulens and Delmon, 1977, Clay Min. 25, pp 271-277; Bulens et al, 1978, J. Am. Ceram. Soc. 61, pp 81-84; Johnson and Pask, 1982, Am. Ceram. Soc. Bull. 61, pp 838-842). This clearly highlights the crucial role of clay in providing a stabilised matrix of mullite and cristobalite, as well as inducing the catalyst network itself to melt and form the same two phases.

The products introduced into the furnace undergo a firing process, using a temperature treatment of up to 1400° C. According to a particular embodiment, the firing process may have a temperature profile according to the pattern shown in FIG. 3. The general firing profile is as follows:

A: heating from room temperature to 450-550° C. (in particular, 500° C.);
B: constant temperature at 450-550° C. (in particular, 500° C.);
C: heating from B to 750-900° C. (in particular, 850° C.);
D: constant temperature at 750-900° C. (in particular, 850° C.);
E: heating from D to 900-1300° C. (in particular, 1050° C.);
F: constant temperature from E (in particular, 1050° C.); and
G: cooling.

In particular, the firing profile of step E may comprise heating from D to 950-1250° C.

In particular, the temperature of steps A, C and E increases at the rate of 5° C./minute to 20° C./minute. The temperature of steps B, D and F may be kept constant for: 30 minutes to 12 hours in step B; 30 minutes to 12 hours in step D; 30 minutes to 60 hours in step F. The range of temperature depends on the size, shape and chemical composition of the material to be fired and also on the type of furnace used, i.e. tunnel furnace, batch furnace or rotary furnace. The cooling involved in step G may be natural cooling.

Depending on the type of processing equipment and furnace used, different products can be produced.

For example using processing equipment such as roller and pan mills for mixing, milling and vacuum extruder for extrusion of products and by using different extruder mouth pieces, different product shapes can be formed. The water content of the material is usually less than 25% for the process. Alternatively there is the soft mud or wet clay process equipment where the material is processed by steam treatment and mixing using rotary shafts. Following this, the material is fed through a mould chain press for product forming. The end product is then demoulded and left to dry.

Furnace such as the tunnel kiln, rotary kiln or any other types of kiln can be used.

Depending on the type of processing equipment, furnace used and the type of extruder mouth/dye piece or mould used, different products can be produced.

In addition, different chemical additives can be added during the process to change the colour and provide additional binding strength for the end product, if required. For example, lignin to provide binding strength and iron oxide powders too create rich red colours.

Figure 4:
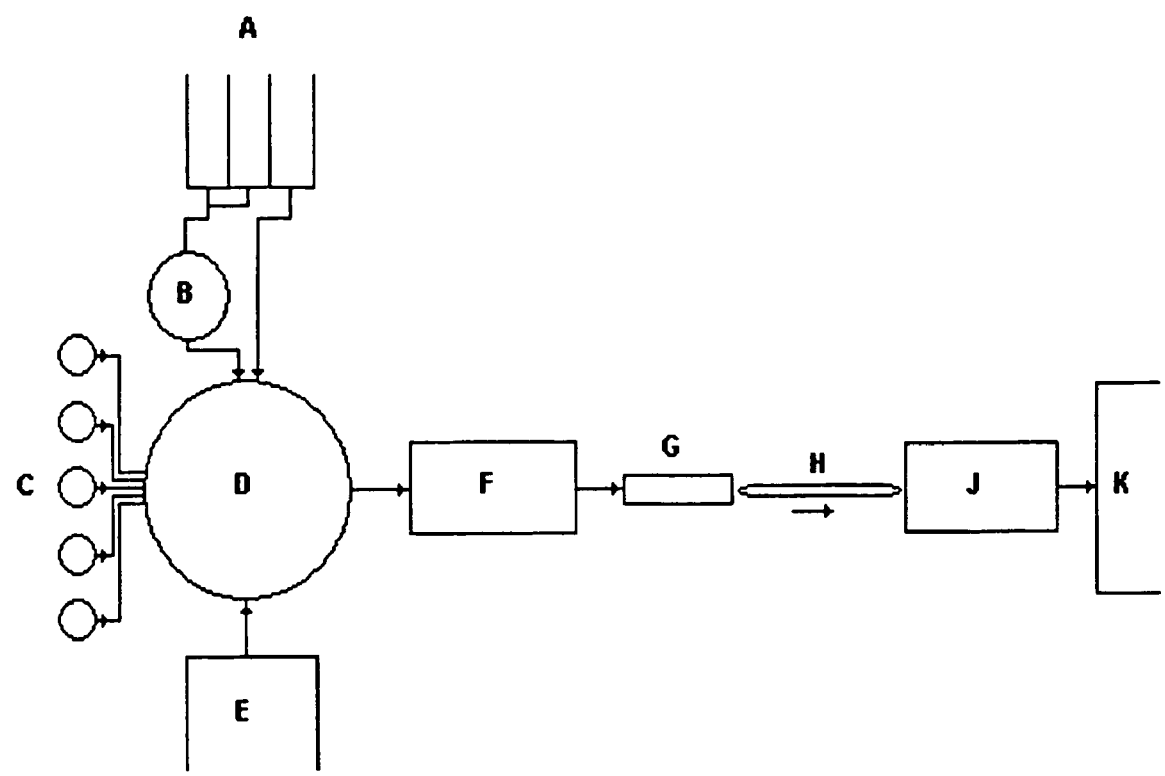
FIG. 4 shows the layout of various units used in one embodiment of the method of the invention. The various units referred to in the Figure are as follows: A is the waste storage unit, B is the pre-treatment unit for the waste unit, C consists of the chemicals and additives silo units, D is the mixing unit, E is the clay storage unit, F is the ageing unit, G is the shaping unit, H is the drying unit, J is the kiln unit and K is the product storage unit.

According to another embodiment, the method of the invention may be carried out in the manner shown in FIG. 4.

In particular, a pre-weighted ratio of waste materials stored in the waste storage unit, A, are either directly sent to the mixing unit, D, or undergo pre-treatment at the pre-treatment unit, B. Pre-treatment may help to condition the waste so that the waste may be easier to manage in the subsequent steps. For example, pre-treatment may include fine crushing, sieving, mixing, dewatering and/or drying of the waste.

The mixture of waste is then further conditioned with additives and chemicals from the silos, C, inside the mixing unit, D, for a stipulated amount of time. The time may vary, depending on the characteristics of the waste. In particular, the time may be between 15 minutes to 1 hour. The additives and chemicals comprise alkali based compounds, phosphate based compounds, alumina based compounds and optional fluxing agents and molecular sieves. The quantity of additives and chemicals added to the mixture of waste may vary, as it depends on the toxicity of the waste being processed.

In particular, the alkali based and phosphate based compounds may be $Na_2SiO_3$ and/or $Na_3PO_4$. The alumina based compounds may be $Al(OH)_3$ and/or $Al_2O_3$. Any suitable fluxing agent for the method of the invention may be used, as already described. Any suitable molecular sieve as described above may be used. The waste used for the present method may be waste as already described.

Clay, which is stored in clay storage unit, E, is then added into the mixing unit, D. For example, the clay may be pre-treated. Further additives and chemicals may be added to the mixing unit, D. In particular, the waste to clay ratio in mixing unit, D, may be between 1:99 to 70:30, the ratio based on the total weight of the mixture. The mixture is then mixed for a pre-determined time so that a consistent paste or slurry mixture is obtained. The paste or slurry is then processed to an ageing station, F, where the paste or slurry is allowed to undergo a reduction in moisture content before reaching the shaping unit, G. In particular, the ageing time in ageing station, F, may vary between 15 minutes to 48 hours.

The resulting shaped products may then be further dried using a dryer, H, before being sent to the kiln unit, J, where the products undergo vitrification involving a firing process. In dryer, H, the water content of the shaped products may be reduced to 0 to 10 weight % based on the total weight of the product, depending on the time the product is dried. The firing process may reach temperatures of up to 1400° C. However, the time allowed for the products to undergo vitrification may vary depending on the type of products required. After the firing process, the fired products are then collected and stored at the product storage unit, K.

According to a particular embodiment, the mixture from mixing unit, D, may be stored in ageing station, F. Accordingly, the ageing time at the ageing station F may vary, depending on the amount of time the mixture from mixing unit, D, is stored.

The products can be, for example, aggregate-like as raw material for concrete or land fill material and land reclamation, gravel-like aggregate material for concrete or road construction, brick-like for road pavers, building and construction materials, tile-like material for building and construction materials, road barrier, erosion control blocks, construction blocks, retaining wall blocks, rail road ties, bricks or blocks for cobble sidewalk or street, stones or tiles for patio or sidewalk, sewer or drain pipes, fibre glass insulation, ceiling tiles, wall boards, roofing tiles, and floor tiles.

Accordingly, the invention also provides a vitrified product obtained or obtainable by any embodiment of the method of the invention.

The product according to the invention is a product comprising stabilised heavy metals, wherein the product is a vitrified product of a mixture of at least hazardous waste, comprising heavy metals that have been stabilised into the structure of the ceramic matrix, molecular sieve (with the proviso that carbon-based molecular sieve is excluded) and clay. The product of the invention may be a product wherein the mixture which is vitrified further comprises at least one of alkali based compounds, phosphate based compounds or alumina based compounds. The alkali based and/or phosphate based compounds may be $Na_2SiO_3$ and/or $Na_3PO_4$ and the alumina based compounds may be $Al_2O_3$ and/or $Al_2O_3$.

According to an embodiment, the product is such that the mixture which is vitrified is obtained by preparing a pre-stabilised mixture 1 comprising waste and the molecular sieve, and mixing the pre-stabilised mixture 1 with clay to form a pre-stabilised mixture 2. The pre-stabilised mixtures 1 and 2 may further comprise at least one of alkali based compounds, phosphate based compounds or alumina based compounds. The alkali based and/or phosphate based compounds may be $Na_2SiO_3$ and/or $Na_3PO_4$, and the alumina based compound may be $Al_2O_3$ and/or $Al_2O_3$. The mixtures may be aged for a suitable period of time as described earlier prior to vitrifying the mixture to obtain the product.

The product obtainable or obtained by a method according to any embodiment of the invention is a value-added product suitable, for example, for construction or land reclamation.

When non-hazardous wastes are used for the purpose of the invention, the waste could be subjected to the same method as described to derive a similar product of the invention.

The completed product of the invention is then packed and stored.

Having now generally described the invention, the same will be more readily understood through reference to the following examples which are provided by way of illustration, and are not intended to be limiting of the present invention.

EXAMPLES

Example 1

Seven different types of industrial waste containing heavy metals are selected and treated. The list of selected waste is reported in Table 1.

The pre-stabilisation of this waste consists of 3 part zeolite and 7 part industrial waste. The industrial waste and zeolite were mixed together in a mixing vessel till slurry. If the natural water content was too low, water was added to the mix till a slurry mixture was obtained.

The mix was maintained for 4 hours. After which, $Na_2SiO_3$ was added to change the pH to 9.0. The pre-stabilised mix was left to age for 8 hours.

Marine clay was mixed with the pre-stabilised mix in the proportion of 65:35 and the material was processed through a series of mixing and extrusion machines to produce test samples. Water content at this point was maintained at 20% to 25%.

The samples were dried in a drying oven at 105° C. till the water content reached 0% to 3%.

The product was fired in the furnace at a predetermined firing profile (the general pattern of firing profile is shown in FIG. 3).

A: Heating from room temperature i.e. 30° C. to 550° C. Ramping time: 5° C./min
B: Constant Temp at 550° C. for 2 hours.
C: Heating from 550° C. to 900° C. Ramping time: 5° C./min
D: Constant Temp at 900° C. for 2 hours.
E: Heating from 900° C. to 1050° C. Ramping time: 5° C./min
F: Constant Temp 1050° C. for 6 hours.
G: Natural Cooling The fired product was subjected to a leaching test. The results are shown below in Table 1.

TABLE 1

Leaching Test Results of waste samples before and after processing

| 1 Type of Industrial Waste | 2 Metal in TCLP leachate | 3 Treated Product | 4 Untreated Waste | 5 Allowable Level (WHO) | 6 Allowable Level (USEPA) TCLP | 7 Allowable Level - Sitting 1985 |
|---|---|---|---|---|---|---|
| Petroleum Waste 1 | V (ppm) | ND | c.a. 11 | 2.0 | — | 0.7 |
|  | Ni (ppm) | c.a. 0.05 | c.a. 0.7 | 2.0 | — | 1.3 |
| Petroleum Waste 2 | V (ppm) | c.a. 0.16 | c.a. 15 | — | — | 0.7 |
|  | Co (ppm | c.a. 0.13 | c.a. 67 | — | — | 0.7 |
|  | Mo (ppm)) | c.a. 1.62 | c.a. 84 | — | — | 7.0 |
| Petroleum Waste 3 | V (ppm) | c.a. 0.21 | c.a. 18 | — | — | 0.7 |
|  | Ni (ppm) | c.a. 0.26 | c.a. 35 | 2.0 | — | — |
|  | Mo (ppm | c.a. 1.8 | c.a. 79 | — | — | 7.0 |
| $TiO_2$ Sludge | Pb (ppm) | c.a. 0.12 | c.a. 7.2 | 5.0 | 5.0 | — |
|  | Trichloro ethylene | ND | c.a. 10.1 | 0.5 | — | — |
| Copper Slag | Ni (ppm) | c.a. 0.11 | c.a. 27 | 2.0 | — | — |
|  | Pb (ppm) | c.a. 0.004 | c.a. 31 | 5.0 | 5.0 | — |
|  | Cu (ppm | c.a. 0.08 | c.a. 12 | 2.0 | — | — |
| Semi-Conductor Waste | As (ppm) | ND | c.a. 19 | 5.0 | 5.0 | — |
| Steel Slag | Cu (ppm) | c.a. 0.03 | c.a. 12 | 2.0 | — | — |
|  | Cr (ppm) | ND | c.a. 10 | 5.0 | 5 | — |
|  | Cd (ppm | ND | c.a. 7 | 0.5 | 1 | — |

Column 1 shows the type of industrial waste treated with the technology

Column 2 shows the predominant heavy metal present in the industrial waste

Column 3 shows the leaching results of the predominant metals after being treated with the technology Column 4 shows the leaching results of the predominant metals in the untreated industrial waste Column 5, 6, 7 shows the allowable standards for the heavy metals From Table 1, it can be seen that there is significant difference between the leachability of heavy metals from the treated and untreated industrial waste. The treatment reduces the leachability of the industrial waste to an environmentally safe level.

Industrial waste metal leachability in the untreated form, as shown in the Table 1, is found to be above the allowable limits. Allowable metal content limits from the World Health Organization (WHO) standards, US Environmental Protection Agency (EPA) and Sitting standards were used as benchmarks.

The industrial wastes treated using the technology were then tested for their metal leachability. The results showed that the metals were safely stabilised in the matrix and did not leach out into the environment.

Example 2

Partial oxidation carbon, POX carbon from a petrochemical company in Singapore was tested and treated using the technology.

The pre-stabilization consisted of 2 parts zeolite and 8 parts POX carbon. POX carbon and zeolite were mixed together in the mixing vessel. The water content of the mixture was maintained at 30% to 40%. If the natural water content is too low, water is added to the mix.

The mix was maintained for 1 hour. After which, $Na_2SiO_3$ and $Na_3PO_4$ were added in the proportion of 4:1 respectively to change the pH to 9.0. The pre-stabilised mix was aged for 2 hours.

Marine clay was mixed with the pre-stabilised mix in the proportion of 85:15 and the material was processed by passing it through a series of mixing and extrusion machines. Test samples of 50 mm×12 mm×30 mm dimensions were produced. Water content at this point was maintained at 20% to 25%.

The samples were dried in a drying oven at 105° C. till the water content reached 0% to 3%.

The product was fired in the furnace and the fired product was subjected to a leaching test. The "before treatment" and "after treatment" results are shown below in Table 2.

The product is fired in the furnace at a predetermined firing profile.

A: Heating from room temperature i.e. 30° C. to 550° C. Ramping time: 5° C./min
B: Constant Temp at 550° C. for 2 hours.
C: Heating from 550° C. to 800° C. Ramping time: 5° C./min
D: Constant Temp at 800° C. for 1 hours.
E: Heating from 800° C. to 1050° C. Ramping time: 5° C./min
F: Constant Temp 1050° C. for 6 hours.
G: Natural Cooling

TABLE 2

Initial Leaching Test Results on Waste Samples (TCLP) obtained from POX Carbon. (*Ni exceeds allowable limits of 5 mg/l (National Environmental Agency, NEA, Singapore) for hazardous waste classification.)

| Metal | Before treatment Concentration mg/l | After treatment Concentration mg/l |
|---|---|---|
| Ba | 0.0383 | N.D. |
| Cd | 0.0027 | N.D. |
| Cr | 0.0016 | N.D. |
| Cu | 0.0392 | 0.0032 |
| Fe | 0.0275 | 0.6298 |
| Mn | 0.1189 | 0.3075 |
| Ni | 7.2584* | 0.0257 |
| Pb | N.D. | N.D. |
| Zn | 3.7265 | 0.1243 |
| As | 0.7088 | 0.1064 |
| Be | 0.0552 | N.D. |
| V | N.D. | N.D. |

N.D.: Not detected

The values obtained from the test results are below NEA limits for hazardous waste classification, thus are safe for disposal or reuse.

Example 3

The technology was used to treat contaminated marine clay and waste sludge from water works.

The waste sludge obtained from the water treatment plants was in a cake form. It had a high level of alumina based compounds of roughly 30% in solid form with the remainder 70% water. The 30% solids consisted of mainly Al-based compounds ($Al(OH)_3$), including organic material, bacteria and silica based compounds. Very low levels of heavy metals were detected in the waste sludge. The waste sludge was used as a source of alumina for the stabilisation of heavy metals in this technology.

The chemical analysis of the synthetic contaminated marine clay is shown in Tables 3 and 4.

TABLE 3

Analysis of contaminated marine clay

| | Concentration of Heavy Metals (in mg/L) | | | | | |
|---|---|---|---|---|---|---|
| | Cr | Mn | Cu | Zn | As | Pb |
| Sample A | 428* | 1154* | 3534* | 4937* | 367* | 1427* |

TABLE 4

Trace metal limits for marine clay as allowed in Singapore

| | Concentration of Heavy Metals (in mg/L) | | | | | |
|---|---|---|---|---|---|---|
| | Cr | Mn | Cu | Zn | As | Pb |
| trace metals limit (Singapore) | 50 | NA | 55 | 150 | 30 | 65 |

The pre-stabilisation mixture consisted of 1 part zeolite and 2 parts waste sludge from the water works and 7 parts synthetic contaminated marine clay. The different contents were mixed together in a mixing vessel. The water content of the mixture was maintained at 30% to 40%. If the natural water content is too low, water is added to the mix.

The mix was maintained for 8 hours. The material was processed through a series of mixing and extrusion machines. Test samples of 50 mm×12 mm×30 mm dimensions were produced. Water content at this point was maintained at 20% to 25%.

The samples were dried in a drying oven at 105° C. till the water content reached 0% to 3%.

The product was fired in the furnace and the fired product was subjected to a leaching test. The results are shown below in Table 5.

The product was fired in the furnace at a predetermined firing profile and subjected to a leaching test (FIG. 3).
A: Heating from room temperature i.e. 30° C. to 500° C. Ramping time: 5° C./min
B: Constant Temp at 500° C. for 3 hours.
C: Heating from 500° C. to 900° C. Ramping time: 5° C./min
D: Constant Temp at 900° C. for 2 hours.
E: Heating from 900° C. to 1050° C. Ramping time: 5° C./min
F: Constant Temp 1050° C. for 8 hours.
G: Natural Cooling

TABLE 5

TCLP Leaching Results for Stabilised Samples treated with the technology.

| Metal | Concentration mg/l (mg/L) | Limits (mg/L) |
| --- | --- | --- |
| Cr | N.D. | 5.0 |
| Cu | 0.0215 | 100.0 |
| Mn | 0.2851 | 50.0 |
| Pb | 0.0322 | 5.0 |
| Zn | 1.4711 | 100.0 |
| As | 0.0643 | 5.0 |

N.D.: Not determined

The values obtained from the test results are below NEA limits for hazardous waste classification, thus are safe for disposal or reuse.

The invention claimed is:

1. A method for heavy metal stabilisation comprising:
mixing waste, comprising heavy metals, with molecular sieve with the proviso that carbon-based molecular sieve is excluded, and clay;
ageing the resultant mixture; and
vitrifying the mixture,
wherein the molecular sieve is spent synthetic zeolite from petroleum/petrochemical refining processes.

2. The method of claim 1, comprising the steps of:
preparing a pre-stabilised mixture 1 by mixing waste, comprising heavy metals, with the molecular sieve;
mixing the pre-stabilised mixture 1 with clay forming a pre-stabilised mixture 2; and vitrifying the obtained mixture.

3. The method of claim 2, wherein the pre-stabilised mixture 1 is a slurry-based mixture.

4. The method of claim 1, wherein the step of ageing the mixture is carried out from 15 minutes to 48 hours.

5. The method of claim 1, further comprising adjusting the pH of the mixture to 8.0-12.0.

6. The method of claim 5, wherein the pH of the mixture is adjusted to 9.5.

7. The method of claim 5, wherein the pH is adjusted by adding alkali based and/or phosphate based compounds to the mixture.

8. The method of claim 1, comprising precipitating the heavy metals.

9. The method of claim 8, wherein the heavy metals are in the form of metal cations, compounds and/or complexes.

10. The method of claim 8, wherein the heavy metals are precipitated by adding alkali based and/or phosphate based compounds to the mixture.

11. The method of claim 1, further comprising adding alkali based and/or phosphate based compounds to the mixture.

12. The method of claim 1, further comprising adding at least an alumina based compound to the mixture.

13. The method of claim 1, further comprising adding at least an alumina based compound to the mixture at the same time, before or after the addition of alkali based and/or phosphate based compounds.

14. The method of claim 12, wherein a source of alumina based compounds is sludge from water and/or wastewater treatment plants.

15. The method of claim 12, wherein the alumina based compound is aluminium hydroxide ($Al(OH)_3$) and/or aluminium oxide ($Al_2O_3$).

16. The method of claim 15, wherein the $Al_2O_3$ is metastable phase of alumina and/or gamma-alumina.

17. The method of claim 1, comprising adding phosphate based compounds, wherein the phosphate based compound reacts with calcium in the waste and/or clay to form apatite, the heavy metals being incorporated into the apatite.

18. The method of claim 1, wherein the waste is hazardous and/or industrial waste comprising heavy metals.

19. The method of claim 18, wherein the hazardous and/or industrial waste comprising heavy metals is selected from the group consisting of: spent carbon from absorption processes, spent carbon from residue oil cracking processes, spent clay from petrochemical refining, spent catalyst from petroleum/petrochemical refining, spent waste and/or sludge from petroleum and/or petrochemical refining, waste sludge from semiconductor processes containing arsenic, incinerator bottom ash and/or fly ash, spent copper slag and sludge from ship sand blasting, sawing and/or etching waste from electronics industries, slag from metal refining, $TiO_2$ waste from paint industries, heavy metal contaminated clay, waste containing heavy metals.

20. The method of claim 19, wherein the spent carbon from residue oil cracking processes is POX carbon.

21. The method of claim 19, wherein the spent catalyst from petrochemical refining is hydrotreating catalyst, hydrocracking and/or FCC catalyst.

22. The method of claim 7, wherein the ratio of alkali based compounds to phosphate based compounds is 50:50 to 100:0 in volume.

23. The method of claim 1, wherein the ratio of molecular sieve to waste is 1:2000 to 7:3 of dry weight.

24. The method of claim 1, wherein Si and/or Al of the molecular sieve is substituted by B, Ca, Zn, Ga, Ge, Ti, V, Fe or P.

25. The method of claim 1, wherein the molecular sieve comprises at least one of B, Ca, Zn, Ga, Ge, Ti, V, Fe, P, Si or Al.

26. The method of claim 1, wherein the molecular sieve is of different pore size.

27. The method of claim 1, comprising adding further clay to the final mixture before carrying out the vitrification step.

28. The method of claim 1, wherein the product of vitrification is in the form of bricks, cinder blocks, concrete aggregates, sand-like raw material for concrete or land fill material, or gravel-like aggregate material for concrete or road construction, road barrier, erosion control blocks, construction blocks, retaining wall blocks, rail road ties, bricks or blocks for cobble sidewalk or street, stones or tiles for patio or sidewalk, sewer or drain pipes, fibre glass insulation, ceiling tiles, wall boards, roofing tiles, and floor tiles.

29. The method of claim 1, wherein the mixing steps involved need not be carried out in any particular order.

30. The method of claim 7, wherein the alkali based compound is $Na_2SiO_3$ and the phosphate based compound is $Na_3PO_4$.

31. The method of claim 30, wherein the ratio of $Na_2SiO_3$ to $Na_3PO_4$ is 50:50 to 100:0 in volume.

32. The method of claim 1, further comprising the addition of at least one fluxing agent to the mixture.

33. The method of claim 32, wherein the fluxing agent is borate.

34. The method of claim 1, wherein the vitrification is achieved by using temperature treatment of up to 1400° C.

35. A method for heavy metal stabilisation comprising:
mixing waste, comprising heavy metals, with molecular sieve with the proviso that carbon-based molecular sieve is excluded, and clay;
ageing the resultant mixture;
adjusting the pH of the mixture to 8.0-12.0; and
vitrifying the mixture,
wherein the pH is adjusted by adding $Na_2SiO_3$ and/or $Na_3PO_4$ to the mixture.

36. The method of claim 35, comprising the steps of:
preparing a pre-stabilised mixture 1 by mixing waste, comprising heavy metals, with the molecular sieve, $Na_2SiO_3$ and/or $Na_3PO_4$;
mixing the pre-stabilised mixture 1 with clay forming a pre-stabilised mixture 2;
vitrifying the obtained mixture.

37. The method of claim 36, wherein the pre-stabilised mixture 1 is a slurry-based mixture.

38. The method of claim 35, wherein the step of ageing the mixture is carried out from 15 minutes to 48 hours.

39. The method of claim 35, comprising precipitating the heavy metals.

40. The method of claim 35, comprising adding phosphate based compounds, wherein the phosphate based compound reacts with calcium in the waste and/or clay to form apatite, the heavy metals being incorporated into the apatite.

41. The method of claim 35, wherein the ratio of molecular sieve to waste is 1:2000 to 7:3 of dry weight.

42. The method of claim 35, wherein the molecular sieve is natural and/or synthetic molecular sieve.

43. The method of claim 35, wherein the molecular sieve is of different pore size.

44. The method of claim 35, wherein the molecular sieve is zeolite.

45. The method of claim 35, further comprising the addition of at least one fluxing agent to the mixture.

46. The method of claim 35, wherein the vitrification is achieved by using temperature treatment of up to 1400° C.

* * * * *